US009665540B2

(12) United States Patent
Symes (10) Patent No.: US 9,665,540 B2
(45) Date of Patent: May 30, 2017

(54) VIDEO DECODER WITH A PROGRAMMABLE INVERSE TRANSFORM UNIT

(75) Inventor: Dominic H Symes, Cambridge (GB)

(73) Assignee: ARM Limited, Cambridge (GB)

( * ) Notice: Subject to any disclaimer, the term of this patent is extended or adjusted under 35 U.S.C. 154(b) by 1514 days.

(21) Appl. No.: 13/137,126

(22) Filed: Jul. 21, 2011

(65) Prior Publication Data

US 2013/0022128 A1    Jan. 24, 2013

(51) Int. Cl.
*H04N 7/30* (2006.01)
*G06F 17/14* (2006.01)
*H04N 19/44* (2014.01)
*H04N 19/625* (2014.01)
*H04N 19/42* (2014.01)

(52) U.S. Cl.
CPC ........... *G06F 17/147* (2013.01); *H04N 19/44* (2014.11); *H04N 19/625* (2014.11); *H04N 19/42* (2014.11)

(58) Field of Classification Search
CPC ............ G06F 17/147; H04N 19/00533; H04N 19/00775; G06T 9/007
USPC ........................................................ 375/240
See application file for complete search history.

(56) References Cited

U.S. PATENT DOCUMENTS

| 5,737,256 | A  | * | 4/1998  | Nakagawa et al. | ........... | 708/400 |
| 2004/0024992 | A1 | * | 2/2004  | Ku | ................. | 712/210 |
| 2006/0280374 | A1 | * | 12/2006 | Hsiun et al. | .................. | 382/250 |
| 2010/0321579 | A1 | * | 12/2010 | Ahmad et al. | ................ | 348/607 |

OTHER PUBLICATIONS

A Low-Cost Very Large Scale Integration Architecture for Multistandard Inverse Transform, Honggang Qi, Qingming Huang, Senior Member, IEEE, and Wen Gao, Fellow, IEEE, IEEE Transactions on Circuits and Systems- II: Express Briefs. vol. 57, No. 7, Jul. 2010, pp. 551-555.
A Highly Efficient Inverse Transform Architecture for Multi-Standard HDTV Decoder, Hang Zhang, Peilin Liu, Yu Hong, Dajiang Zhou and Satoshi Goto, IEEE, Oct. 2009, pp. 525-528.

* cited by examiner

Primary Examiner — Nguyen Truong
(74) Attorney, Agent, or Firm — Nixon & Vanderhye P.C.

(57) ABSTRACT

A data processing apparatus is provided for performing video decoding operations on blocks of video data, the data processing apparatus comprising: a programmable inverse transform unit configured to perform an inverse transform operation on a set of input values in response to a sequence of instructions, the programmable inverse transform unit comprising a first execution path and a second execution path arranged to perform data operations to implement the inverse transform operation, wherein the data operations performed by the first and second execution path are configured in dependence on the sequence of instructions, wherein the programmable inverse transform unit is configured to operate in a first mode in which each instruction in the sequence of instructions is interpreted using a first instruction length and causes the first execution path and the second execution path to be configured independently of each other, and the programmable inverse transform unit is configured to operate in a second mode in which each instruction in the sequence of instructions is interpreted using a second instruction length, the second instruction length being shorter than the first instruction length, and causes the second execution path to be configured in dependence on a configuration of the first execution path.

33 Claims, 6 Drawing Sheets

VIDEO DECODER WITH A PROGRAMMABLE INVERSE TRANSFORM UNIT

BACKGROUND OF THE INVENTION

Field of the Invention

The present invention relates to video decoders. More particularly, this invention relates to video decoders configured to perform inverse transform operations as part of their decoding operations.

Description of the Prior Art

A contemporary video decoder may be required to perform video decoding operations in accordance with a number of video standards, such as MPEG2, MPEG4, H.263, H.264 high profile, VP8, VC-1 and so on. It is known that a particularly computationally intensive part of the video decoding process is the inverse transform operation (often implemented as an inverse discrete cosine transform).

Video decoding is typically performed on the basis of 8×8 blocks of pixel data, wherein four 8×8 blocks of luma (Y) data and two 8×8 blocks of chroma (Cb and Cr) data represent a given macroblock of the video data. The inverse transform operation is performed on all six 8×8 blocks for each macroblock to produce six inverse transformed output 8×8 blocks. The inverse transform on an 8×8 block of values may be implemented as one 8×8 transform, two 8×4/4×8 transforms or four 4×4 transforms, the choice between these options being defined on a macroblock-by-macroblock basis. Accordingly, if six 8×8 blocks are typically handled by the inverse transform process for each macroblock of the encoded video, wherein each 8×8 block must be subjected to one of four different inverse transform configurations (8×8; 8×4; 4×8 or 4×4), and the particular inverse transform operation is defined in accordance with the particular video standard used to encode the current frame of video data, it will be appreciated that a great number and variety of operations are needed to be performed as part of the inverse transform process. Furthermore it is common for a contemporary video standard to require a conformant video decoder to provide a bit-exact implementation of the inverse discrete cosine transformation (IDCT), and hence a contemporary multi-standard video decoder is required to be able to perform a considerable range operations in order to implement the inverse transform process. Providing the capability to handle the number and variety of operations required to perform the inverse transform thus represents a significant design challenge.

One approach to providing a video decoder able to perform the inverse transform operations required by a range of video standards is for the inverse transform operation to be performed by software (for example on a DSP or general purpose processor). Whilst this common technique has the advantage that new video standards or developments to existing standards can be handled by appropriate updating of the software, on the other hand a relatively large and powerful processor is required to provide sufficient performance for contemporary video (e.g. high definition (HD) video at 1080p30), which can consume both considerable power and silicon area.

Alternatively, a more hardware-based approach may be taken to the provision of the required inverse transform processing, but although it may be possible to share some of the hardware required for performing the inverse transform operations for each standard, an extensive amount of circuitry may still be required to provide the inverse transform operations for each standard. Moreover a hardware-based approach is liable to lack flexibility for supporting new or developing standards. For example, "A Low-Cost Very Large Scale Integration Architecture for Multistandard Inverse Transform", Honggang Qi, Qingming Huang and Wen Gao, IEEE Transactions on Circuits and Systems II: Express Briefs, July 2010, Vol. 57 Issue 7, pp. 551-555 concentrates on sharing circuits between the different video standards at the circuit level. Alternatively, "A highly efficient inverse transform architecture for multi-standard HDTV decoder", Hang Zhang, Peilin Liu, Yu Hong, Dajiang Zhou and Satoshi Goto, IEEE 8th International Conference on ASIC, 2009, October 2009, pp. 525-528 uses an approach based on tables to provide some configurability to the linear inverse transform operations. However, in practice not all transforms are linear.

Accordingly, it would be desirable to provide an improved technique for enabling the inverse transform operations to be performed within a video decoder, which retained the flexibility and adaptability of a software-based approach, whilst also being provided within a relatively small and efficient hardware unit.

SUMMARY OF THE INVENTION

Viewed from a first aspect, the present invention provides a data processing apparatus configured to perform video decoding operations on blocks of video data, the data processing apparatus comprising: a programmable inverse transform unit configured to perform an inverse transform operation on a set of input values in response to a sequence of instructions, said programmable inverse transform unit comprising a first execution path and a second execution path arranged to perform data operations to implement said inverse transform operation, wherein said data operations performed by said first and second execution path are configured in dependence on said sequence of instructions, wherein said programmable inverse transform unit is configured to operate in a first mode in which each instruction in said sequence of instructions is interpreted using a first instruction length and causes said first execution path and said second execution path to be configured independently of each other, and said programmable inverse transform unit is configured to operate in a second mode in which each instruction in said sequence of instructions is interpreted using a second instruction length, said second instruction length being shorter than said first instruction length, and causes said second execution path to be configured in dependence on a configuration of said first execution path.

The video decoder (data processing apparatus configured to perform the video decoding operations on blocks of video data) comprises a programmable inverse transform unit which performs an inverse transform operation on a set of input values in response to a sequence of instructions. Accordingly, the instructions define the operations performed by the programmable inverse transform unit and not only can different sequences of instructions be provided to enable the required inverse transform operations for a range of video standards, but also these instructions can be updated to enable the same programmable inverse transform unit to be adapted to carry out new inverse transform operations defined by updated or entirely new video standards.

The programmable inverse transform unit itself comprises a first execution path and a second execution path which are the components which implement the inverse transform operation. Although the provision of a programmable inverse transform unit which responds to a sequence of instructions has advantages in terms of flexibility and adaptability, previously such a software-style approach has come at the expense of the programmable inverse transform unit forming part of a relatively large processor. However, the inventor of the present invention realised that a programmable inverse transform unit could be provided in a relatively compact manner, and furthermore requiring only a relatively limited set of instructions per inverse transform operation, by arranging the programmable inverse transform unit to have (at least) two execution paths, wherein the configuration of these execution paths depends on a current mode of the programmable inverse transform unit. More specifically, in a first mode instructions in the sequence of instructions are interpreted as having a first instruction length and the first and second execution paths are configured independently of each other. In a second mode, the sequence of instructions are interpreted as having a second instruction length, that second instruction length being shorter than the first instruction length used in the first mode, and the second execution path is configured in dependence on a configuration of the first execution path. This means that the encoding space of the instructions forming the sequence instructions is particularly efficiently used, not only allowing independent configuration of each execution path in the first mode, but causing the second execution path to be configured in dependence on a configuration of the first execution path in the second mode, wherein each instruction is interpreted using the shorter, second instruction length. Overall, this approach enables the flexibility normally associated with a purely software-based approach, whilst providing this within a relatively limited amount of hardware.

In one embodiment said programmable inverse transform unit is configured, when in said first mode, to perform a single inverse transform operation on said set of input values, and said programmable inverse transform unit is configured, when in said second mode, to perform two individual inverse transform operations on said set of input values, a first inverse transform operation being applied to a first half of said set of input values and a second inverse transform operation being applied to a second half of said set of input values. Hence in this embodiment in the first mode the programmable inverse transform unit treats the set of input values as a unitary set and performs a single inverse transform operation thereon, whilst in the second mode the programmable inverse transform unit treats the set of input values in two halves, a separate inverse transform operation being performed on each half. This provides the programmable inverse transform unit with a great degree of flexibility in how its first and second execution paths are used to implement inverse transform operations.

In one embodiment, each block of video data comprises 8 by 8 data values, wherein, when in said first mode, said programmable inverse transform unit is configured to perform an 8-point inverse transform operation, and wherein, when in said second mode, said programmable inverse transform unit is configured to perform two 4-point inverse transform operations. Whilst the size of each block of video data being processed could in principle vary, and the inverse transform operation could take a number of forms, it is typical for each block of the video data to comprise 8 by 8 data values and for the programmable inverse transform unit to be configured to perform an 8-point inverse transform operation or two 4-point inverse transform operations as appropriate. Hence, when in its first mode, the programmable inverse transform unit is arranged to perform an 8-point inverse transform operation on a set of 8 input values taken from the block of video data being processed, whilst in its second mode the programmable inverse transform unit is configured to perform two 4-point inverse transform operations, on each of two half sets of four data values.

In one embodiment, when in said second mode, said programmable inverse transform unit is configured to perform said two 4-point inverse transform operations on eight consecutive data values in a row or column of said block of video data. In another embodiment, when in said second mode, said programmable inverse transform unit is configured to perform said two 4-point inverse transform operations on two sets of four data values in adjacent rows or columns of said block of video data. Accordingly, the two "half sets" of data values that form the input data values in the second mode may either be taken from a set of data values forming a full row (or column) of the block being processed or may be taken from two adjacent half-rows (or half-columns) of the block being processed.

In one embodiment said programmable inverse transform unit is configured iteratively to perform said inverse transform operation over each row of data values and each column of data values of each block, each said row of data values and each said column of data values providing said set of input values in turn. This enables the programmable inverse transform unit to process each data value in a block both as a data value performing part of a row and as a data value forming part of a column. The inverse transforms used by many video standards are typically based upon a two-dimensional inverse transform operation applied to a block of data values. As mentioned above, separating the two-dimensional inverse transform operation into one-dimensional inverse transform operations reduces the number of multiplicative operations which must be performed, although this then requires two passes of the one-dimensional inverse transform operation, and this embodiment provides these two passes, the first passing through the block as rows and the second passing through the block as columns.

In one embodiment said programmable inverse transform unit is configured to determine if it should operate in said first mode or in said second mode for each said row of data values and for each said column of data values. Configuring the programmable inverse transform unit to determine on a row-by-row and column-by-column basis whether it should operate in the first mode or the second mode provides the video decoder with full flexibility in implementing the one-dimensional inverse transform operations, for example whether each row or column should be handled as a set of 8 data values or as two sets of 4 data values.

In one embodiment said first and said second execution paths each comprise at least one multiplication unit, each said multiplication unit configured to perform multiply-accumulate operations, each said multiply-accumulate operation comprising multiplying a specified multiplicand value from said set of input values by a specified coefficient, and a result of each said multiply-accumulate operation being accumulated in a target accumulation register selected from a set of accumulation registers. Inverse transform operations may typically be factorized into a number of multiplication operations applying specified coefficients to each of the set of separate values, the results of which are then appropriately summed to produce the resultant inverse transformed value. The ability to configure the operations the multiplication units of the first and second execution paths by specifying the multiplicand, the coefficient and the target accumulation register provides a flexible and re-configurable inverse transform unit.

In one embodiment, said programmable inverse transform unit is configured to maintain a program counter value indicative of a current instruction in said sequence of instructions, and said target accumulation register is determined with reference to said program counter value. Configuring the target accumulation register to be determined with reference to a program counter value simplifies the design of the programmable inverse transform unit (thus reducing the area, it takes up), in particular removing the need for accumulator forwarding paths.

In one embodiment said target accumulation register is determined with reference to a predetermined number of least significant bits of said program counter value. Arranging the target accumulation register to be determined with reference to the least significant bits of the program counter value provides an arrangement in which the cyclic rotation through the accumulator registers can be made within a predetermined subset of the accumulation registers. Note also that the predetermined number of least significant bits used can depend on the particular target accumulation register. Again, no accumulator forwarding paths are required to provide this.

In one embodiment said programmable inverse transform unit is configured to determine said specified multiplicand value, said specified coefficient, and said multiply-accumulate operations to be performed by said multiplication units in said first execution path and said second execution path from each said instruction in said sequence of instructions. Accordingly, the multiply-accumulate operations performed by the multiplication units in each path can be flexibly defined in dependence upon the definitions set out in each instruction.

In one embodiment, when said programmable inverse transform unit is in said second mode said specified coefficient and said multiply-accumulate operations to be performed are the same for said multiplication units in said first execution path and said second execution path. Arranging the multiply-accumulate operations to be the same for the multiplication units in the first and the second execution path is advantageous because of the encoding space saved in the instructions, since a given instruction need only define one operation for the first execution path, not explicitly for both the first and second execution paths.

In one embodiment said first execution path comprises a first multiplication unit and said second execution path comprises two second multiplication units and wherein, when said programmable inverse transform unit is in said second mode, said specified coefficient and said multiply-accumulate operations to be performed are the same for said first multiplication unit and for one of said two second multiplication units. Accordingly when the second execution path comprises two multiplication units, just one of these two multiplication units can mirror the operation of the multiplication units in the first execution path, also saving encoding space as mentioned above.

In one embodiment said set of input values are held in a set of input registers associated with said first and second execution paths.

In one embodiment said programmable inverse transform unit is configured to selectively write back a selected result of a selected multiply-accumulate operation into a selected input register of said set of input registers in dependence on each said instruction in said sequence of instructions. Enabling a selected result to be written back to a selected input register in this manner enables iterated multiply operations in an inverse transform to be supported by the programmable inverse transform unit.

In one embodiment said programmable inverse transform unit is configured to write back only a higher order set of bits of said selected result. Some video encoding standards use iterated multiplications which are expressed in a form which may be efficiently implemented by the provision of the ability to write back the higher order set of bits of a selected result, for example writing back the high 16 bits of a 32 bit result.

In one embodiment said programmable inverse transform unit comprises an input multiplexer configured to rearrange an order of said set of input values before said set of input values are stored in said set of input registers. The ability to rearrange the order of the set of input values enables the execution paths to be more efficiently used depending on the particular calculations which are required at each step. This rearrangement may take a number of forms but in one embodiment said input multiplexer is configured to perform a bit-reversed ordering of said set of input values.

In one embodiment said input multiplexer is configured to rearrange said order differently in dependence on whether said programmable inverse transform unit is in said first mode or said second mode. The ordering of the input values may depend on whether the programmable inverse transform unit configures the first and second execution paths independently or dependently.

In one embodiment said second execution path comprises at least two multiplication units.

In one embodiment said first instruction length is an integer multiple of said second instruction length. Arranging the first instruction length to be a integer multiple of the second instruction length enables the storage provided for the instructions, in particular limited storage local to the programmable inverse transform unit (such as a set of registers), to be particularly efficiently used, since storage space which accommodates instructions of the first instruction length will also accommodate a number of instructions of the second instruction length without wasted space. The particular length and ratio of first and second instruction lengths may of course vary, but in one embodiment said first instruction length is 32 bits and said second instruction length is 8 bits.

In one embodiment said sequence of instructions is stored locally to said programmable inverse transform unit. Having the sequences of instructions stored locally to the programmable transform unit is advantageous because of the reduction in memory bandwidth resulting from not needing to continuously fetch instructions for execution by the programmable inverse transform unit. There are various ways in which this local storage could be provided, but in one embodiment said sequence of instructions is stored in a set of registers within said programmable inverse transform unit.

In one embodiment said programmable inverse transform unit is configured to fetch said sequence of instructions prior to performing said inverse transform operation and is configured to perform said inverse transform operation without fetching further instructions. Accordingly, the programmable inverse transform unit and the sequence of instructions are arranged such that the whole sequence of instructions required for performing the inverse transform operation may be locally stored. Hence, once the sequence of instructions has been fetched into the local storage of the programmable inverse transform unit, no further instruction fetching is required until a different set of instructions is needed (for example as part of decoding video according to a different standard).

In one embodiment said sequence of instructions is determined in dependence on a video standard used to encode said video data.

In one embodiment said sequence of instructions is stored in a set of registers within said programmable inverse transform unit, wherein said data processing apparatus is configured to load said sequence of instructions into said set of registers upon a determination of said video standard.

In one embodiment said sequence of instructions is determined per frame of said video data.

In one embodiment said programmable inverse transform unit comprises a post-processing unit configured to combine values stored in said set of accumulation registers into a final set of transformed data values. This gives further flexibility to the programmable inverse transform unit and saves operand bits by simplifying the operations that must be performed within the multiplication units of each execution path.

The inverse transform operation may take a number of forms but in one embodiment said inverse transform operation is an inverse orthogonal transform operation. In one particular embodiment, said inverse transform operation is a one-dimensional inverse discrete cosine transform operation. The factorization of a two-dimensional inverse transform into two one-dimensional inverse transform operations simplifies the implementation of the inverse transform, in particular reducing the number of multiplication operations that must be performed Viewed from a second aspect, the present invention provides a data processing apparatus configured to perform video decoding operations on blocks of video data, the data processing apparatus comprising: programmable inverse transform means for performing an inverse transform operation on a set of input values in response to a sequence of instructions, said programmable inverse transform means comprising first execution path means and second execution path means for performing data operations to implement said inverse transform operation, wherein said data operations performed by said first and second execution path means are configured in dependence on said sequence of instructions, wherein said programmable inverse transform means is configured to operate in a first mode in which each instruction in said sequence of instructions is interpreted using a first instruction length and causes said first execution path means and said second execution path means to be configured independently of each other, and said programmable inverse transform means is configured to operate in a second mode in which each instruction in said sequence of instructions is interpreted using a second instruction length, said second instruction length being shorter than said first instruction length, and causes said second execution path means to be configured in dependence on a configuration of said first execution path means.

Viewed from a third aspect the present invention provides a method of performing video decoding operations on blocks of video data, the method comprising: performing an inverse transform operation on a set of input values in response to a sequence of instructions; configuring a first execution path and a second execution path to perform data operations to implement said inverse transform operation, wherein said data operations performed by said first and second execution path are configured in dependence on said sequence of instructions; operating in a first mode in which each instruction in said sequence of instructions is interpreted using a first instruction length and said first execution path and said second execution path are configured independently of each other; and operating in a second mode in which each instruction in said sequence of instructions is interpreted using a second instruction length, said second instruction length being shorter than said first instruction length, and said second execution path is configured in dependence on a configuration of said first execution path.

BRIEF DESCRIPTION OF THE DRAWINGS

The present invention will be described further, by way of example only, with reference to embodiments thereof as illustrated in the accompanying drawings, in which.

DESCRIPTION OF THE PREFERRED EMBODIMENTS

Figure 1:
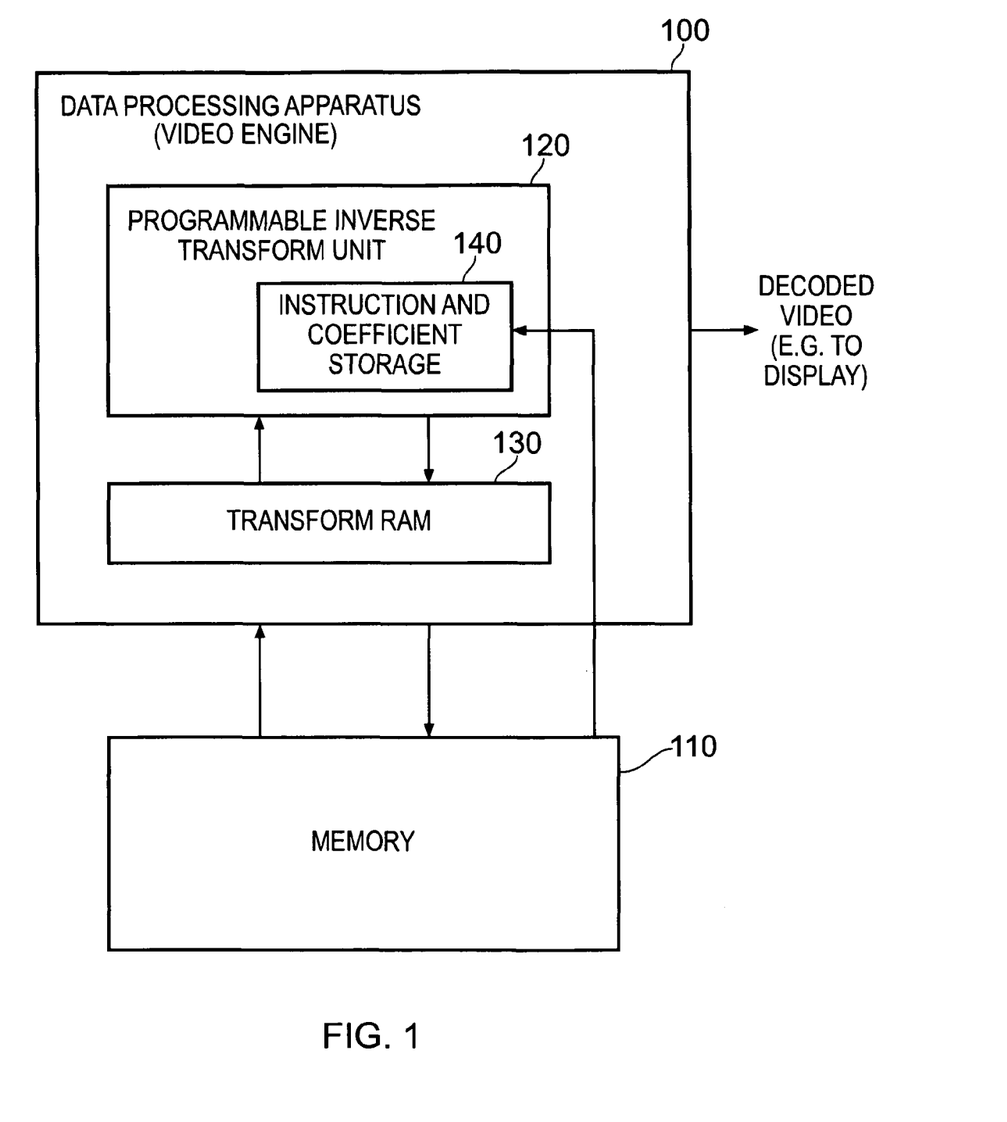
FIG. 1 schematically illustrates a data processing apparatus in one embodiment.

FIG. 1 schematically illustrates a data processing apparatus 100 in one embodiment. The data processing apparatus (video engine) 100 is configured to perform video decoding operations on encoded video data, such that the decoded video may, for example, be displayed. In the illustrated embodiment, the encoded video data is retrieved from memory 110 for processing in the video engine 100. It would of course be possible for the data processing apparatus 100 to receive the encoded video data from a number of different static sources (such as the memory 110 illustrated) or from a variety of dynamic sources (e.g. streaming from the internet). It will be appreciated that, even viewed schematically, the data processing apparatus 100 comprises many more components (with which the skilled person is familiar) than those illustrated in FIG. 1. In FIG. 1, the data processing apparatus 100 is only shown comprising the components which are of significance to the present discussion, namely a programmable inverse transform unit 20 and a transform RAM 130.

The programmable inverse transform unit 120 is configured to perform one of the most computationally intensive parts of the video decoding process namely the inverse transform operation used to transform coefficients extracted from the encoded video data into values used to generate the displayed pixels. The programmable inverse transform unit 120 can be configured to perform the inverse transform operations (specifically the inverse discrete cosine operations) required by various video standards. In particular, the inverse transform operations that the programmable inverse transform unit 120 carries out are configured by a sequence of instructions which are stored in instruction and coefficient storage unit 140 within the programmable inverse transform unit 120.

In order to perform its inverse transform operations, the programmable inverse transform unit 120 is configured to retrieve an appropriate sequence of instructions for storage in instruction and coefficient storage unit 140, these instructions being retrieved from memory 110. Coefficient values required for performing the inverse transform operations are also retrieved from memory 110 and stored in the storage unit 140. The sequence of instructions retrieved is determined on the basis of the video standard used to encode the video data being decoded by the data processing apparatus 100. Accordingly, once the sequence of instructions is stored in instruction storage unit 140 it may be used to control the operation of the programmable inverse transform unit 120 until it is determined that video data of a different video standard is required to be decoded, at which stage an appropriate new sequence of instructions must be pre-stored in the instruction storage 140. In the illustrated embodiment, in operation the encoded video data is retrieved from memory 110 and various (not illustrated) initial steps are carried out to extract the transform coefficients which are then temporarily stored in the transform RAM 130. The programmable inverse transform unit 120 handles 8 by 8 blocks of data values at a time, retrieving them from transform RAM 130, performing the inverse transform operation required and writing them back to transform RAM 130. The data processing apparatus 100 is further configured to perform other known steps to use the data values generated by the inverse transform unit and stored in the transform RAM 130 to produce the decoded video signals which are then typically passed to a frame buffer (not illustrated) as part of the display process, but may alternatively be, for example, written back to memory 110.

The basic template for the inverse transform operations implemented by contemporary video standards is a two-dimensional inverse discrete cosine transform (IDCT). This 2D IDCT can be separated into a one-dimensional IDCT which is applied in two passes, first to each row and then to each column of the data. This separation into two 1D IDCTs is indeed utilised by various contemporary video standards and most do indeed specify the row (horizontal) transform first, although some (e.g. VP8) specify the column (vertical) transform first. Shifting and rounding in a specific implementation mean that the order is significant.

Figure 2:
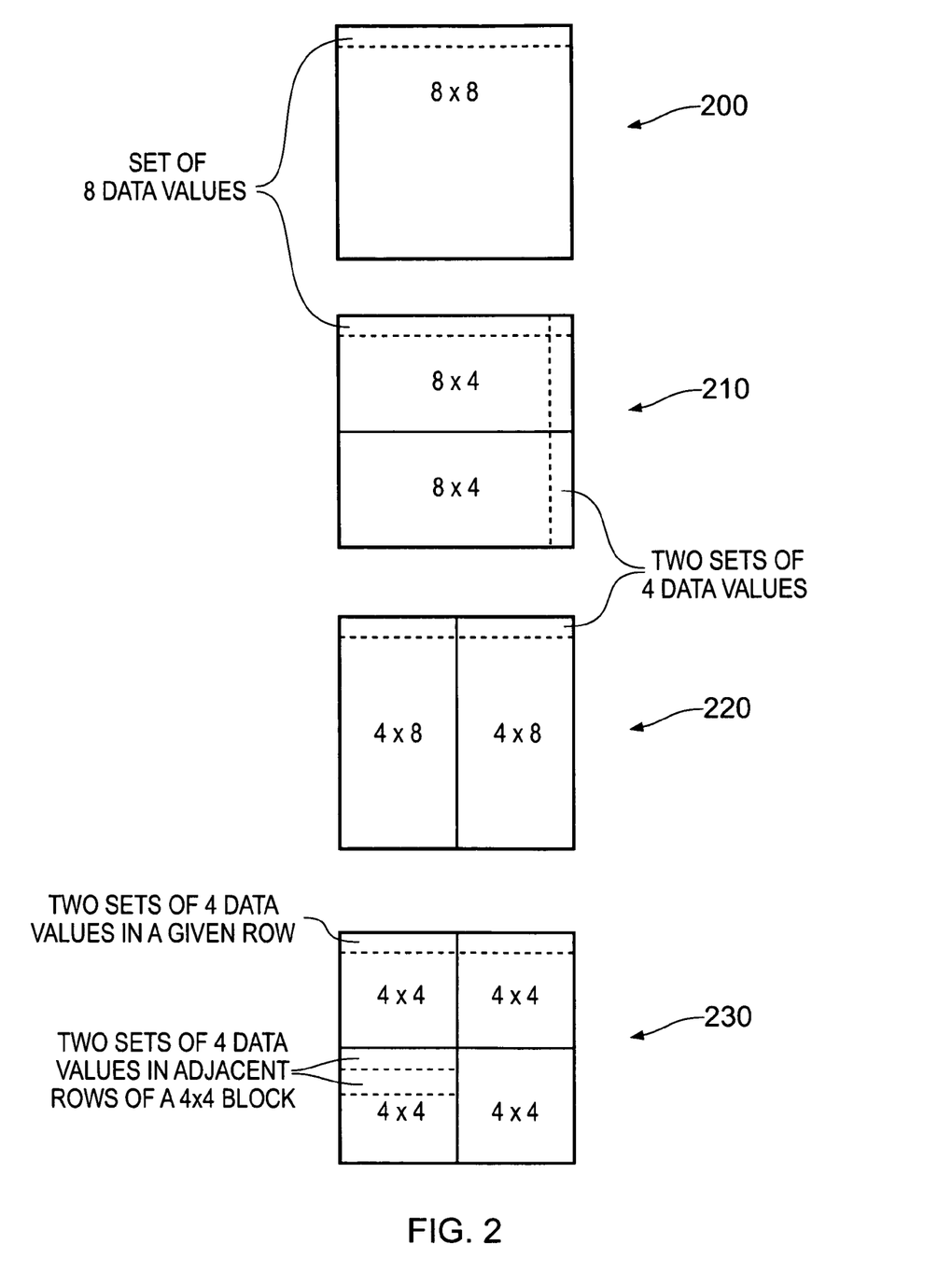
FIG. 2 schematically illustrates how a block of 8 by 8 data values may be transformed, either as an 8×8 transform, as two 8×4/4×8 transforms, or by four 4×4 transforms.

A further feature of the inverse transform process is that each 8 by 8 block may be transformed using a single 8×8 transform, two 8×4/4×8 transforms or four 4×4 transforms. This is schematically illustrated in FIG. 2. Each of these transforms 200, 210, 220, 230 is treated within the present context as being separable into two 1D IDCT passes. Accordingly, it can be seen with reference to FIG. 2 that each 1D IDCT pass will implement a single 8-point transform or two 4-point transforms on a set of 8 data values. On the 8×8 block 200 both rows and columns will be treated as an 8-point transform, whilst in the set of 4×4 blocks 230 both rows and columns will be treated as two 4-point transforms. For the 8×4 and 4×8 blocks 210 and 220 either an 8-point transform or two 4-point transforms will be carried out depending on whether a row or column is selected.

Further, when implementing two 4-point transforms on a block such as block 230 which has been transformed as four sub-blocks of 4×4 data values, the two sets of 4 data values may either be taken from two consecutive sets of values in a given row or column of the whole (8×8) block, or can be taken as consecutive rows or columns from within a given 4×4 sub-block. Accordingly, in the former case, the 8×8 block will be processed on a row-by-row and column-by-column (rows then columns, or columns then rows as appropriate) basis, whereas in the latter case each 4×4 block will be processed as two pairs of rows and two pairs of columns (or vice versa) in turn.

Figure 3:
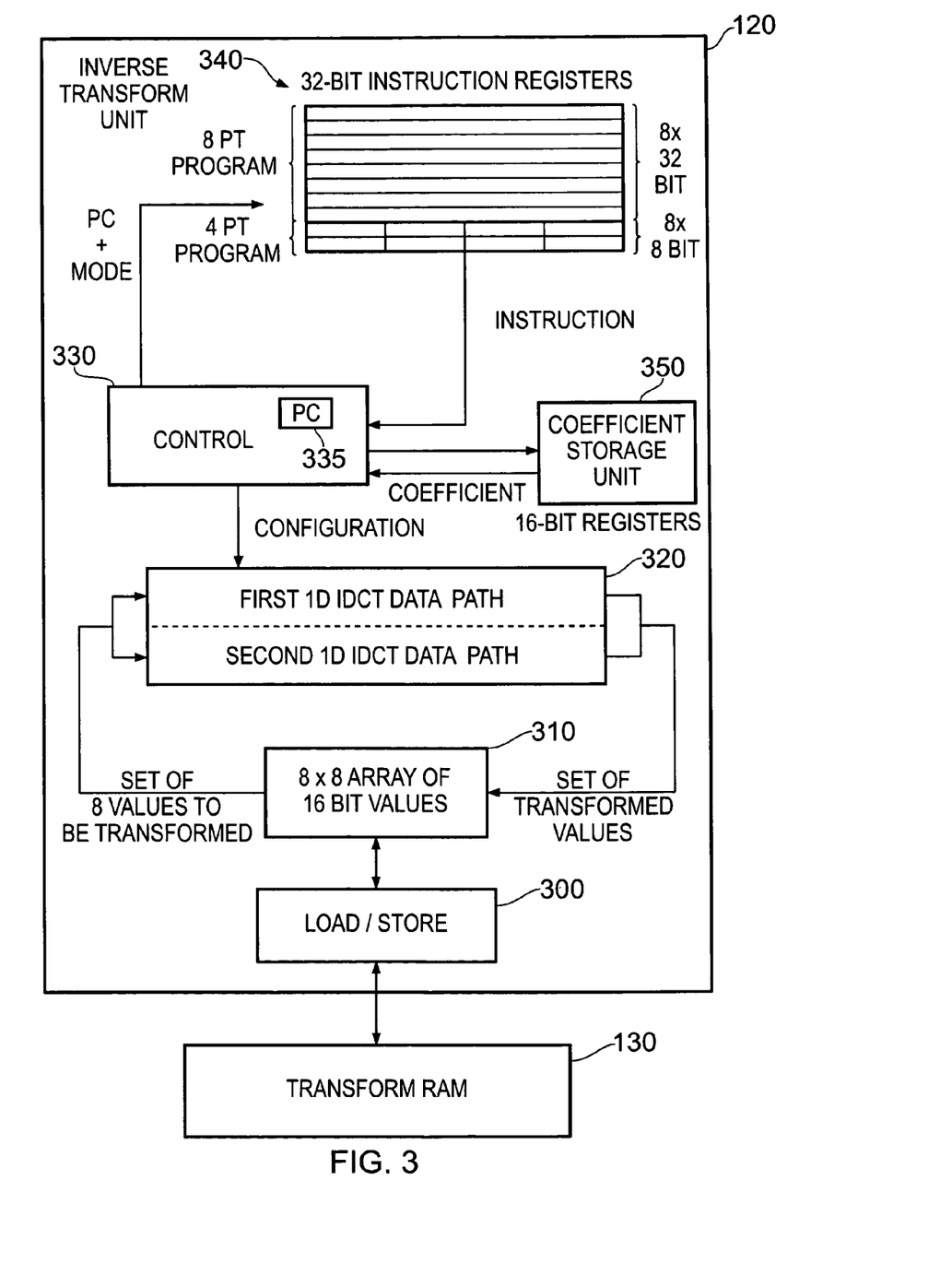
FIG. 3 schematically illustrates in more detail the configuration of the programmable inverse transform unit in one embodiment.

FIG. 3 schematically illustrates in more detail the configuration of the programmable inverse transform unit 120 shown in FIG. 1. The load/store unit 300 is configured to retrieve transform coefficients from transform RAM 130 in 8 by 8 blocks and to cause these to be temporarily stored in the 8 by 8 array 310. This set of values is then generally processed by the inverse transform unit on a row-by-row and column-by-column basis to perform the two passes of one-dimensional inverse transforms necessary to implement the required inverse transform. The row or column currently being processed is retrieved from the array 310 and passed into the first and second data paths 320. Note that in the special case mentioned above of two 4-point inverse transforms being performed on adjacent half rows or half columns, the set of 8 data values retrieved from array 310 are then not retrieved from a full row or column of the array 310, but rather from two adjacent half rows (or half columns). The particular configuration of the data paths 320 is determined by control unit 330 in dependence on the sequence of the instructions stored in the 32-bit instruction registers 340. The control unit 330 also has access to coefficient storage unit 350 to retrieve the appropriate coefficient values specified by the retrieved instructions for passing to the data paths 320 for use by the multiplication units of the data paths. The coefficients are specific to the program being carried out and in the particular embodiment illustrated in FIG. 3, there are 7 16-bit coefficients stored in coefficient storage unit 350 for use by the 8-point, program and 3 16-bit coefficients stored in coefficient storage unit 350 for use by the 4-point program. The control unit 330 maintains a program counter (PC) 335 which is referenced when retrieving an instruction from the instruction registers 340 and when configuring the data paths 320.

The instructions registers 340 store two sequences of instructions, one for performing the 8-point IDCT and one for performing the 4-point IDCT. Both sequences of instructions comprise 8 instructions. Each of the 8-point program instructions is 32 bits in length, whilst each of the 4-point program instructions is 8 bits in length. Accordingly, the control unit 330 is configured to interpret instructions having a 32 bit length when performing the 8-point IDCT (also referred to herein as the inverse transform unit operating in a "first mode") and to interpret the program instructions as having an 8 bit length when performing the 4-point IDCT (also referred to herein as the inverse transform unit operating in a "second mode"). Hence, the processing performed in the data paths 320 on the eight data values taken from the 8 by 8 array 310 is performed as a sequence of 8 operational steps defined by the 8 instructions in either the 8-point program or the 4-point program stored in the instructions registers 340 and making use of coefficient values specified by those instructions and stored in coefficient storage unit 350. The set of result data values generated by the data paths 320 are written back to the 8 by 8 array 310 as a set of transformed values. Once the 8 by 8 array 310 has been processed both row-by-row and column-by-column, the load/store unit 300 is configured to write the inverse transformed array of values back to transform RAM 130 and to retrieve the next 8 by 8 block for processing.

Figure 4:
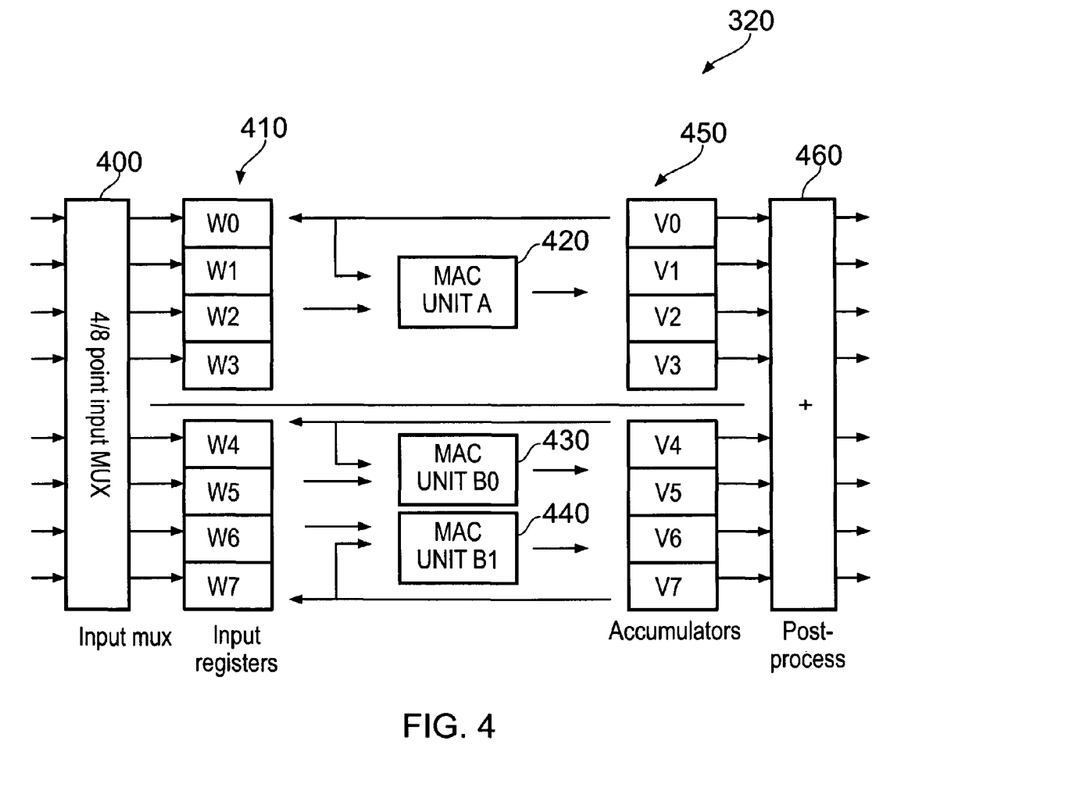
FIG. 4 schematically illustrates in more detail the first and second execution paths in one embodiment.

More detail of the configuration of the data paths 320 shown in FIG. 3 is now described with reference to FIG. 4. The data paths 320 comprise an input multiplexer 400, a set of input registers 410, multiply-accumulate units (multipliers) 420, 430 and 440, accumulator registers 450 and post-processing unit 460. The set of input data values (i.e. the row or column (or pair of half rows/columns) currently being processed) is written into the input registers 410 under the action of input multiplexer 400 in bit-reversed order. This bit-reversal is dependent on whether the data paths are performing the single 8-point transform (first mode) or the dual 4-point transform (second mode). For the 8-point transform the input data values are written into the input registers 410 in the order (viewed from W0 to W7) $X_0$, $X_4$, $X_2$, $X_6$, $X_1$, $X_5$, $X_3$, $X_7$ whilst in the 4-point transform mode the input data values are written into the input registers 410 in the order $X_0$, $X_2$, $X_1$, $X_3$, $X_4$, $X_6$, $X_5$, $X_7$. In other words, the input multiplexer 400 reorders the input data values differently in dependence on whether an 8-point transform or two 4-point transforms are being carried out.

The multipliers 420, 430, 440 are configured in dependence on the current instruction passed from the instruction registers 340 to control unit 330. For the 8-point transform each multiply unit is independently configured and each 32-bit instruction specifies:

- Multiplicand W[i], coefficient C[j] and operation for multiplier 420
- Multiplicand W[i], coefficient C[j] and operation for multiplier 430
- Multiplicand W[i], coefficient C[j] and operation for multiplier 440

The result of the multiplication operation carried out by each of the multiplication units 420, 430, 440 is written into a specified accumulator register 450. The particular accumulator register used is defined as V[PC %4] for multiplier 420 (i.e. cycling through accumulator registers V0-V3, as V[4+(PC %2)] for multiplier 430 (i.e. cycling through accumulator registers V4-V5, and as V[6+(PC %2)] for multiplier 440 (i.e. cycling through accumulator registers V6-V7, where PC is the program counter value maintained in unit 335 in control unit 330 (FIG. 3).

For the dual 4-point transform, each instruction is only 8 bits in length and only specifies:

- Multiplicand W [i], coefficient C [j] and operation for multiplier 420

In the 4-point case the operations for multipliers 430 and 440 are derived from the destination of the operation of multiplier 420 such that when multiply unit 420 is configured to write to one of the accumulator registers V0 or V1, multiplier 430 performs a corresponding operation on the corresponding value in input registers W4-W7 respectively and writes to the corresponding accumulator register V4 or V5, and when multiplier 420 is configured to write to one of the accumulator registers V2 or V3, multiplier 440 is performs a corresponding operation on a corresponding input value in input registers W4-W7 and writes to the corresponding accumulator register V6 or V7. Once the 8 instructions in the respective sequence of instructions have been carried out, the values stored in the accumulator registers 450 are combined/reordered by post-processing unit 460 (in a manner which is standard for all video encoding standards and does not need further description here).

The second data path (i.e. that comprising multiplier 430 and 440) is configured to enable iterated multiplications and a result of a multiply-accumulate operation may be written back to one of the input registers 410. In particular the high 16 bits of the result of a multiply accumulate operation written back.

Various instructions may be defined for use in the 8-point and 4-point programs, but the set of operations defined by the instruction set used in the embodiments described herein are set out in the following table:

| Name | Operation |
|------|-----------|
| MUL  | W[i] * C[j] |
| MLA  | V[k] + (W[i] * C[j]) |
| MLS  | V[k] − (W[i] * C[j]) |
| RMS  | (W[i] * C[j]) − V[k] |
| MULH | (W[i] * C[j]) & 0xFFFF0000 |
| MLAH | (V[k] + (W[i] * C[j])) & 0xFFFF0000 |
| MLSH | (V[k] − (W[i] * C[j])) & 0xFFFF0000 |
| RMSH | ((W[i] * C[j]) − V[k]) & 0xFFFF0000 |
| MUL1H | (W[i] * C1[j]) & 0xFFFF0000 |
| MUL1H | (V[k] + ((W[i] * C1[j])) & 0xFFFF0000 |
| MUL1H | (V[k] − ((W[i] * C1[j])) & 0xFFFF0000 |
| MUL1H | ((W[i] * C1[j]) − V[k]) & 0xFFFF0000 | where C1[j] = C[j] + (1 << 16).

Figure 5:
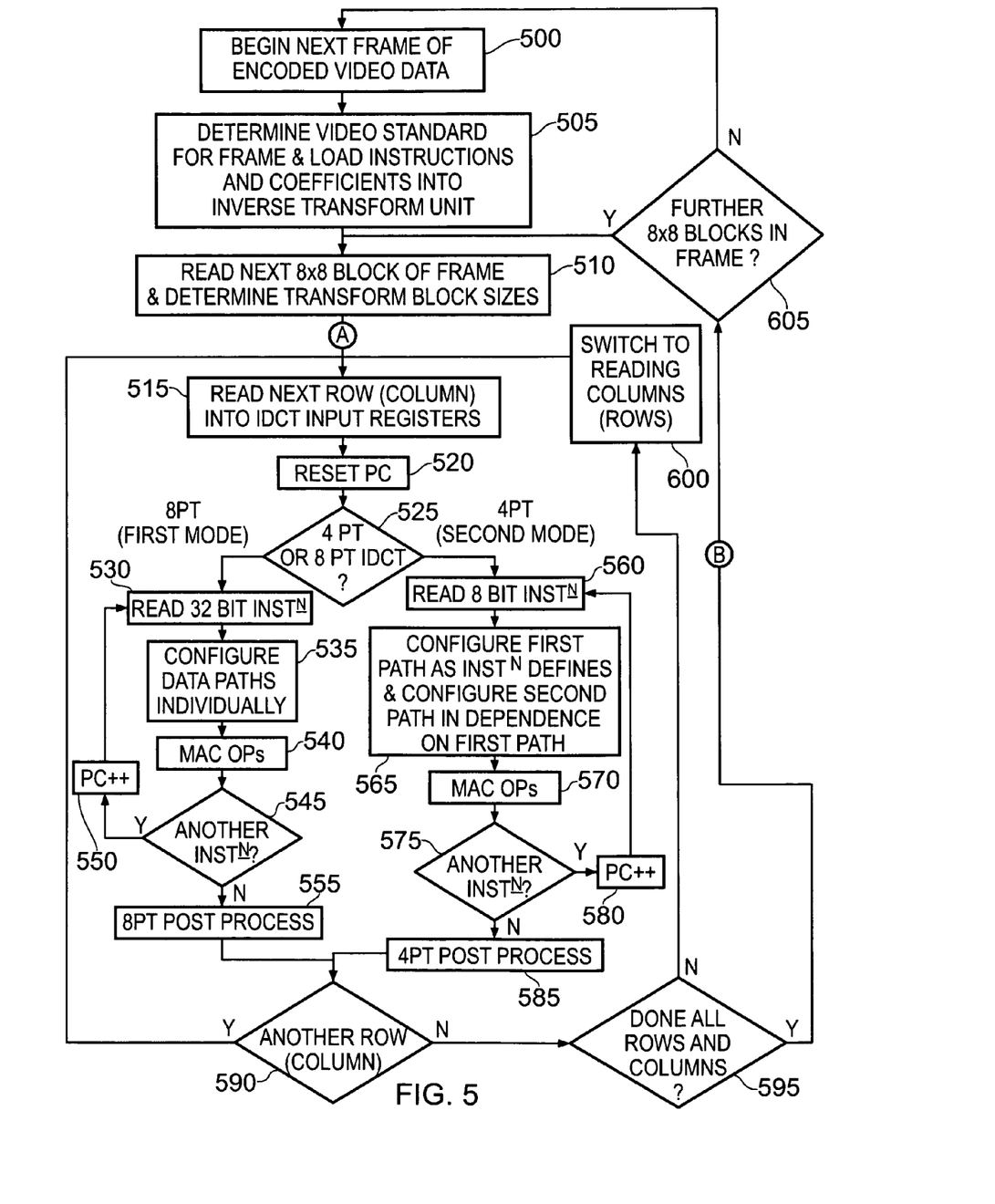
FIG. 5 schematically illustrates a series of steps taken by a data processing apparatus in one embodiment.

FIG. 5 schematically illustrates a series of steps taken within the data processing apparatus of one embodiment. The flow begins at step 500 where a new frame of encoded video data is to be decoded. At step 505, the data processing apparatus 100 determines the video standard according to which this frame has been encoded (for example from header information) and causes a corresponding sequence of instructions and coefficients to be retrieved from memory 110 and stored in the instruction and coefficient storage 140 within the programmable inverse transform unit 120. In the more detailed view of FIG. 3 a set of ten 32-bit values are retrieved from memory and stored in the 32-bit instruction registers 340, providing eight 32-bit instructions for the 8-point program and eight 8-bit instructions for the 4-point program. Also seven 16-bit coefficients for use by the 8-point program and three 16-bit coefficients for use by the 4-point program are stored in coefficient storage unit 350. The decoding of the encoded video data then begins, including some further steps (not illustrated or further discussed here) which extract the transform coefficients from the encoded data, writing them into the transform RAM 130. The following process then handles those transform coefficients on a block-by-block basis to perform the required inverse transform operation thereon.

This begins at step 510 when the first (next) 8 by 8 block is retrieved from the transform RAM 130 by load/store unit 300 and stored in the 8 by 8 array 310. The inverse transform unit is configured to determine from each 8 by 8 block which transform configuration (see FIG. 2) has been used for this block. Assuming that the 8 by 8 block should be handled in set of 8 data values forming a row or a column then the iterative sequence of steps described shown in FIG. 5 and described below iteratively processes the 8 by 8 block stored in array 310 on a row basis and then on a column basis (note that the video standard according to which the video data has been encoded can specify whether rows or columns should be treated first).

If however it is determined that the 8 by 8 block should be handled as a set of four 4 by 4 blocks, each of which should be handled in turn, with pairs of half rows/columns from each 4 by 4 block being processed as the 8 input data values to the data paths, then between points "A" and "B" in FIG. 5 the steps are replaced with those illustrated in FIG. 6 and described in more detail further below.

Hence for the former case of 8 data values being taken from a single row or column of the 8 by 8 block, at step 515 the first (next) row (or column as appropriate) of the 8 by 8 block is read into the IDCT input registers 410 in the data paths 320. The control unit 330 resets the program counter PC at step 520 and depending on whether two 4-point inverse transforms or one 8-point inverse transform should be performed (step 525), the control unit 330 operates the inverse transform unit 120 either in a first mode (8-point inverse transform) or a second mode (4-point inverse transforms).

If the inverse transform unit is configured in its first mode, the control unit 330 causes the first (next) 32-bit instruction to be read from the 8-point program in the 32-bit instruction registers 340 (step 530) and at step 535 the control unit 330 configures the data paths 320 individually (i.e. independent of one another). At step 540 the multipliers 420, 430, 440 perform the multiply-accumulate operations defined in the instruction, accumulating the result in accumulator registers 450. At step 545 it is determined if another instruction is in the sequence and if it is then at step 550 the control unit increments the program counter and the flow returns to step 530.

Once the sequence of instructions for implementing the 8-point inverse transform have each been executed by the data paths, the flow proceeds to step 555 where the post-processing unit 430 performs the final post-processing for the 8-point inverse transform and these values are then written back to the 8 by 8 array 310.

If the inverse transform unit is configured in its second mode, the control unit 330 causes the first (next) 8-bit instruction to be read from the 4-point program in the 32-bit instruction registers 340 (step 560) and at step 565 the control unit 330 configures the first data path (i.e. multiplier 420) to perform the multiply-accumulate operation defined in the instruction. The second data path (i.e. multipliers 430, 440) is then configured to mirror the operation carried out multiplier 420 (as discussed above with reference to FIG. 4). At step 570 the multipliers 420, 430, 440 perform the multiplier accumulate operations thus defined, accumulating the result in accumulator registers 450. At step 575 it is determined if another instruction is in the sequence and if it is at the step 580 the control unit increments the programmer counter and the flow returns to step 560. Once the sequence of instructions for implementing the 4-point inverse transform being executed by the data paths, the flow proceeds to step 585 where the post-processing unit 460 performs the post-processing required for the 4-point process and the transform values are written back to the 8 by 8 array 310.

At step 590 it is determined if another row (column) needs processing in the 8 by 8 array. If it does then the flow returns to step 515 and that next row (column) is processed. If all the rows (columns) have been processed then at step 595 it is determined if the 8 by 8 array has been processed both row-wise and column-wise. If it has not then at step 600 the processing is switched to columns (rows) and the flow returns to step 515. Once all rows and columns have been processed then at step 605 it is determined if this frame has further 8 by 8 blocks that require processing. If it does then the flow returns to step 510. If it does not then the flow returns to step 500.

Figure 6:
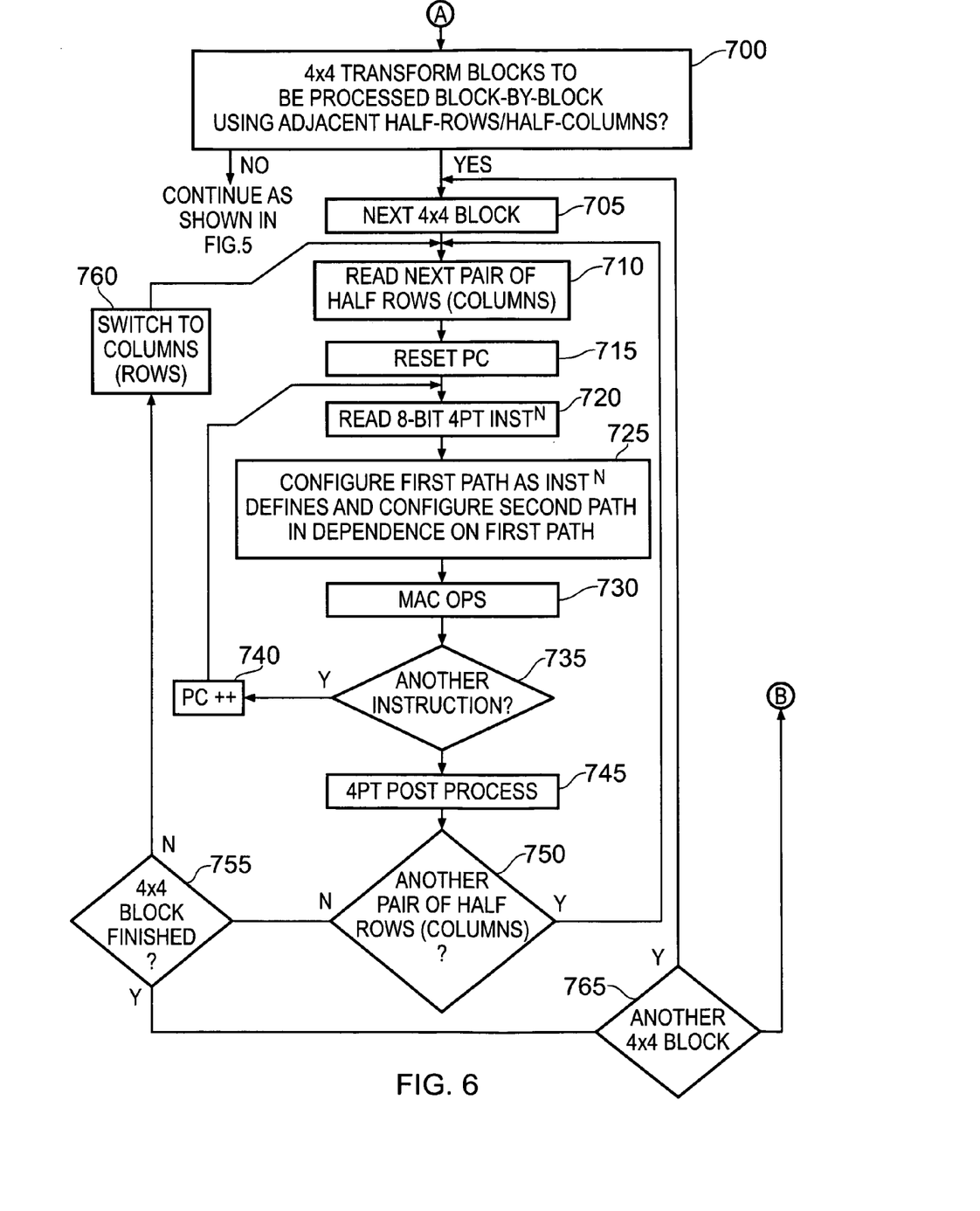
FIG. 6 schematically illustrates a variant for some of the steps of FIG. 5 which are taken in one embodiment.

Returning to point "A" in FIG. 5, if it is determined at step 700 (FIG. 6) that the 8 by 8 block should be handled as a set of four 4 by 4 blocks, each of which should be handled in turn, with pairs of half rows/columns from each 4 by 4 block being processed as the 8 input data values to the data paths, then the flow proceeds to step 705 in FIG. 6.

At step 705 the first (next) 4 by 4 block is processed and at step 710 the first (next) pair of half row (or half column as appropriate) of the 8 by 8 block belonging to this 4 by 4 block is read into the IDCT input registers 410 in the data paths 320. The control unit 330 resets the program counter PC at step 715 and the control unit 330 causes the first (next) 8-bit instruction to be read from the 4-point program in the 32-bit instruction registers 340 (step 720). At step 725 the control unit 330 configures the first data path (i.e. multiplier 420) to perform the multiply-accumulate operation defined in the instruction. The second data path (i.e. multipliers 430; 440) is then configured to mirror the operation carried out multiplier 420 (as discussed above with reference to FIG. 4). At step 730 the multipliers 420, 430, 440 perform the multiplier accumulate operations thus defined, accumulating the result in accumulator registers 450.

At step 735 it is determined if another instruction is in the sequence and if it is at the step 740 the control unit increments the programmer counter and the flow returns to step 720. Once the sequence of instructions for implementing the 4-point inverse transform being executed by the data paths, the flow proceeds to step 745 where the post-processing unit 460 performs the post-processing required for the 4-point process and the transform values are written back to the 8 by 8 array 310.

At step 750 it is determined if another pair of half rows (columns) needs processing for the current 4 by 4 block. If it does then the flow returns to step 710 and that next pair of half rows (columns) is processed. Once the 4 by 4 block has been processed as rows (columns) then the flow proceeds to step 755, where the control unit switches to handling this 4 by 4 block as columns (rows) (step 760). Once the 4 by 4 block has been processed both in terms of rows and columns, the flow proceeds to step 765, where it is determined if there is another 4 by 4 block to be processed within the current 8 by 8 array. If there is then the flow returns to step 705. Once all 4 by 4 blocks within the 8 by 8 array have been processed then the flow rejoins that of FIG. 5 at point "B".

In final summary, a data processing apparatus is disclosed herein, which is configured to perform video decoding operations. In particular, the data processing apparatus comprises a programmable inverse transform unit which performs the computationally intensive inverse transform operation on a set of input values in response to a sequence of instructions. Being programmable in this manner, different sequences of instructions be provided to enable the required inverse transform operations for a range of video encoding standards, but also these instructions can be updated to enable the same programmable inverse transform unit to be adapted to carry out new inverse transform operations defined by updated or entirely new video standards. Furthermore, the programmable inverse transform unit is arranged to operate in either a first mode or a second mode, which determines the manner in which its execution paths are configured. In a first mode instructions in the sequence of instructions are interpreted as having a first instruction length and the first and second execution paths are configured independently of each other. In a second mode, the sequence of instructions are interpreted as having a second instruction length, that second instruction length being shorter than the first instruction length used in the first mode, and the second execution path is configured in dependence on a configuration of the first execution path. The encoding space of the instructions forming the sequence instructions is particularly efficiently used, since independent configuration of each execution path is enabled in the first mode, but by causing the second execution path to be configured in dependence on a configuration of the first execution path in the second mode, valuable instruction encoding space is saved. This compact instruction encoding enables the required sequences of instructions for each more to be held locally, saving memory bandwidth. Overall, this approach enables the flexibility normally associated with a purely software-based approach, whilst providing this within a modest hardware area.

Although particular embodiments of the invention have been described herein, it will be apparent that the invention is not limited thereto, and that many modifications and additions may be made within the scope of the invention. For example, various combinations of the features of the following dependent claims could be made with the features of the independent claims without departing from the scope of the present invention.

I claim:

1. A data processing apparatus configured to perform video decoding operations on blocks of video data, the data processing apparatus comprising:
    a programmable inverse transform unit configured to perform an inverse transform operation on a set of input values in response to a sequence of instructions,
    said programmable inverse transform unit comprising a first execution path and a second execution path arranged to perform data operations to implement said inverse transform operation, wherein said data operations performed by said first and second execution path are configured in dependence on said sequence of instructions,
    wherein said programmable inverse transform unit is configured to operate in a first mode in which each instruction in said sequence of instructions is interpreted using a first instruction length and to cause said first execution path and said second execution path to be configured independently of each other,
    and said programmable inverse transform unit is configured to operate in a second mode in which each instruction in said sequence of instructions is interpreted using a second instruction length, said second instruction length is shorter than said first instruction length, and to cause said second execution path to be configured in dependence on a configuration of said first execution path.

2. The data processing apparatus as claimed in claim 1, wherein said programmable inverse transform unit is configured, when in said first mode, to perform a single inverse transform operation on said set of input values,
    and wherein said programmable inverse transform unit is configured, when in said second mode, to perform two individual inverse transform operations on said set of input values, a first inverse transform operation being applied to a first half of said set of input values and a second inverse transform operation being applied to a second half of said set of input values.

3. The data processing apparatus as claimed in claim 2, wherein each block of video data comprises 8 by 8 data values,
    wherein, when in said first mode, said programmable inverse transform unit is configured to perform an 8-point inverse transform operation, and
    wherein, when in said second mode, said programmable inverse transform unit is configured to perform two 4-point inverse transform operations.

4. The data processing apparatus as claimed in claim 2, wherein when in said second mode, said programmable inverse transform unit is configured to perform said two 4-point inverse transform operations on eight consecutive data values in a row or column of said block of video data.

5. The data processing apparatus as claimed in claim 2, wherein when in said second mode, said programmable inverse transform unit is configured to perform said two 4-point inverse transform operations on two sets of four data values in adjacent rows or columns of said block of video data.

6. The data processing apparatus as claimed in claim 1, wherein said programmable inverse transform unit is configured iteratively to perform said inverse transform operation over each row of data values and each column of data values of each block, each said row of data values and each said column of data values providing said set of input values in turn.

7. The data processing apparatus as claimed in claim 6, wherein said programmable inverse transform unit is configured to determine if it should operate in said first mode or in said second mode for each said row of data values and for each said column of data values.

8. The data processing apparatus as claimed in claim 1, wherein said first and said second execution paths each comprise at least one multiplication unit, each said multiplication unit configured to perform multiply-accumulate operations,
    each said multiply-accumulate operation comprising multiplying a specified multiplicand value from said set of input values by a specified coefficient,
    and a result of each said multiply-accumulate operation being accumulated in a target accumulation register selected from a set of accumulation registers.

9. The data processing apparatus as claimed in claim 8, wherein said programmable inverse transform unit is configured to maintain a program counter value indicative of a current instruction in said sequence of instructions,
    and said target accumulation register is determined with reference to said program counter value.

10. The data processing apparatus as claimed in claim 9, wherein said target accumulation register is determined with reference to a predetermined number of least significant bits of said program counter value.

11. The data processing apparatus as claimed in claim 8, wherein said programmable inverse transform unit is configured to determine said specified multiplicand value, said specified coefficient, and said multiply-accumulate operations to be performed by said multiplication units in said first execution path and said second execution path from each said instruction in said sequence of instructions.

12. The data processing apparatus as claimed in claim 11, wherein, when said programmable inverse transform unit is in said second mode, said specified coefficient and said multiply-accumulate operations to be performed are the same for said multiplication units in said first execution path and said second execution path.

13. The data processing apparatus as claimed in claim 11, wherein said first execution path comprises a first multiplication unit and said second execution path comprises two second multiplication units and wherein, when said programmable inverse transform unit is in said second mode, said specified coefficient and said multiply-accumulate operations to be performed are the same for said first multiplication unit and for one of said two second multiplication units.

14. The data processing apparatus as claimed in claim 8, wherein said set of input values are held in a set of input registers associated with said first and second execution paths.

15. The data processing apparatus as claimed in claim 14, wherein said programmable inverse transform unit is configured to selectively write back a selected result of a selected multiply-accumulate operation into a selected input register of said set of input registers in dependence on each said instruction in said sequence of instructions.

16. The data processing apparatus as claimed in claim 15, wherein said programmable inverse transform unit is configured to write back only a higher order set of bits of said selected result.

17. The data processing apparatus as claimed in claim 14, wherein said programmable inverse transform unit comprises an input multiplexer configured to rearrange an order of said set of input values before said set of input values are stored in said set of input registers.

18. The data processing apparatus as claimed in claim 17, wherein said input multiplexer is configured to perform a bit reversed ordering of said set of input values.

19. The data processing apparatus as claimed in claim 17, wherein said input multiplexer is configured to rearrange said order differently in dependence on whether said programmable inverse transform unit is in said first mode or said second mode.

20. The data processing apparatus as claimed in claim 8, wherein said second execution path comprises at least two multiplication units.

21. The data processing apparatus as claimed in claim 1, wherein said first instruction length is an integer multiple of said second instruction length.

22. The data processing apparatus as claimed in claim 1, wherein said first instruction length is 32 bits and said second instruction length is 8 bits.

23. The data processing apparatus as claimed in claim 1, wherein said sequence of instructions is stored locally to said programmable inverse transform unit.

24. The data processing apparatus as claimed in claim 23, wherein said sequence of instructions is stored in a set of registers within said programmable inverse transform unit.

25. The data processing apparatus as claimed in claim 23, wherein said programmable inverse transform unit is configured to fetch said sequence of instructions prior to performing said inverse transform operation and is configured to perform said inverse transform operation without fetching further instructions.

26. The data processing apparatus as claimed in claim 1, wherein said sequence of instructions is determined in dependence on a video standard used to encode said video data.

27. The data processing apparatus as claimed in claim 26, wherein said sequence of instructions is stored in a set of registers within said programmable inverse transform unit, wherein said data processing apparatus is configured to load said sequence of instructions into said set of registers upon a determination of said video standard.

28. The data processing apparatus as claimed in claim 26, wherein said sequence of instructions is determined per frame of said video data.

29. The data processing apparatus as claimed in claim 8, wherein said programmable inverse transform unit comprises a post-processing unit configured to combine values stored in said set of accumulation registers into a final set of transformed data values.

30. The data processing apparatus as claimed in claim 1, wherein said inverse transform operation is an inverse orthogonal transform operation.

31. The data processing apparatus as claimed in claim 1, wherein said inverse transform operation is a one-dimensional inverse discrete cosine transform operation.

32. A data processing apparatus configured to perform video decoding operations on blocks of video data, the data processing apparatus comprising:
programmable inverse transform means for performing an inverse transform operation on a set of input values in response to a sequence of instructions,
said programmable inverse transform means comprising first execution path means and second execution path means for performing data operations to implement said inverse transform operation, wherein said data operations performed by said first and second execution path means are configured in dependence on said sequence of instructions,
wherein said programmable inverse transform means is configured to operate in a first mode in which each instruction in said sequence of instructions is interpreted using a first instruction length and to cause said first execution path means and said second execution path means to be configured independently of each other,
and said programmable inverse transform means is configured to operate in a second mode in which each instruction in said sequence of instructions is interpreted using a second instruction length, said second instruction length is shorter than said first instruction length, and to cause said second execution path means to be configured in dependence on a configuration of said first execution path means.

33. A method of performing video decoding operations on blocks of video data, the method comprising the steps of:
performing an inverse transform operation on a set of input values in response to a sequence of instructions;
configuring a first execution path and a second execution path to perform data operations to implement said inverse transform operation, wherein said data operations performed by said first and second execution path are configured in dependence on said sequence of instructions;
operating in a first mode in which each instruction in said sequence of instructions is interpreted using a first instruction length and said first execution path and said second execution path are configured independently of each other; and
operating in a second mode in which each instruction in said sequence of instructions is interpreted using a second instruction length, said second instruction length is shorter than said first instruction length, and said second execution path is configured in dependence on a configuration of said first execution path, the above method steps are implemented on a data processing apparatus.

* * * * *